United States Patent
Iakhnine et al.

(10) Patent No.: US 9,342,063 B1
(45) Date of Patent: May 17, 2016

(54) DETERMINING CAPACITIES OF WORK BUFFERS

(71) Applicant: Amazon Technologies, Inc., Reno, NV (US)

(72) Inventors: Serguei Iakhnine, Toronto (CA); James McTavish, Mississauga (CA); Kirill Volgin, Mississauga (CA); Vadim Bachmutsky, Toronto (CA); Vitalii Fedorenko, Mississauga (CA); Kreethigha Thinakaran, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 367 days.

(21) Appl. No.: 14/031,890

(22) Filed: Sep. 19, 2013

(51) Int. Cl.
- *G06F 19/00* (2011.01)
- *G05B 15/02* (2006.01)
- *G06Q 10/06* (2012.01)
- *G06Q 10/08* (2012.01)

(52) U.S. Cl.
CPC ............ *G05B 15/02* (2013.01); *G06Q 10/06* (2013.01); *G06Q 10/087* (2013.01)

(58) Field of Classification Search
CPC ............ G05B 19/41865; G05B 2219/32268; G06Q 10/06; G06Q 10/0631; G06Q 10/087
USPC ...................................... 700/97, 99
See application file for complete search history.

(56) References Cited

U.S. PATENT DOCUMENTS

| | | | | |
|---|---|---|---|---|
| 5,699,242 A * | 12/1997 | Togawa | ............ | G05B 19/41865 700/5 |
| 6,259,959 B1 * | 7/2001 | Martin | ............ | G06Q 10/06 700/99 |
| 6,468,021 B1 * | 10/2002 | Bonora | ............ | H01L 21/67706 198/468.6 |
| 7,236,844 B1 * | 6/2007 | Bai | ............ | G06Q 10/06 700/100 |
| 7,904,194 B2 * | 3/2011 | Brown | ............ | G05B 19/408 700/174 |
| 8,952,284 B1 * | 2/2015 | Wong | ............ | B07C 5/3412 209/586 |
| 2010/0082138 A1 * | 4/2010 | Hayes | ............ | G05B 19/41865 700/99 |
| 2010/0083160 A1 * | 4/2010 | Hayes | ............ | G05B 19/41865 715/772 |
| 2011/0202382 A1 * | 8/2011 | Santos | ............ | G06Q 10/063118 705/7.17 |
| 2011/0208557 A1 * | 8/2011 | Gonzalez Diaz | ............ | G06Q 10/063112 705/7.14 |
| 2011/0295644 A1 * | 12/2011 | Hara | ............ | G06Q 10/06315 705/7.25 |
| 2012/0016710 A1 * | 1/2012 | Santos | ............ | G06Q 10/06 705/7.22 |
| 2012/0216384 A1 * | 8/2012 | Immekus | ............ | B23P 21/004 29/428 |
| 2012/0312875 A1 * | 12/2012 | Von Beichmann | | G06Q 30/0201 235/385 |
| 2014/0108035 A1 * | 4/2014 | Akbay | ............ | G06Q 50/22 705/2 |

OTHER PUBLICATIONS

Mosley, S.A.; Teyner, T.; Uzsoy, R.M., "Maintenance scheduling and staffing policies in a wafer fabrication facility," in Semiconductor Manufacturing, IEEE Transactions on, vol. 11, No. 2, pp. 316-323, May 1998.*

Chang, Qing, et al. "Maintenance staffing management." Journal of Intelligent Manufacturing 18.3 (2007): 351-360.*

* cited by examiner

*Primary Examiner* — Michael D Masinick

(74) *Attorney, Agent, or Firm* — Thomas | Horstemeyer, LLP

(57) ABSTRACT

Disclosed are various embodiments for determining capacities for work buffers. Data is received that indicates past work cycles for a first stage and a second stage of a pipelined process. The pipelined process includes a work buffer between the first stage and the second stage. Staffing levels for the first stage and the second stage are received. An optimal buffer capacity for the work buffer is generated based at least in part on a predicted workflow variance for the pipelined process, the staffing levels, and the past work cycles.

20 Claims, 5 Drawing Sheets

DETERMINING CAPACITIES OF WORK BUFFERS

BACKGROUND

Lean manufacturing is a production practice that seeks to eliminate waste. In lean manufacturing, any expenditure of resources that does not result in a creation of value for the end customer is considered wasteful. Lean manufacturing focuses on preserving value while minimizing labor, product, and/or other inputs. The principles of lean manufacturing may be applied throughout an enterprise.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
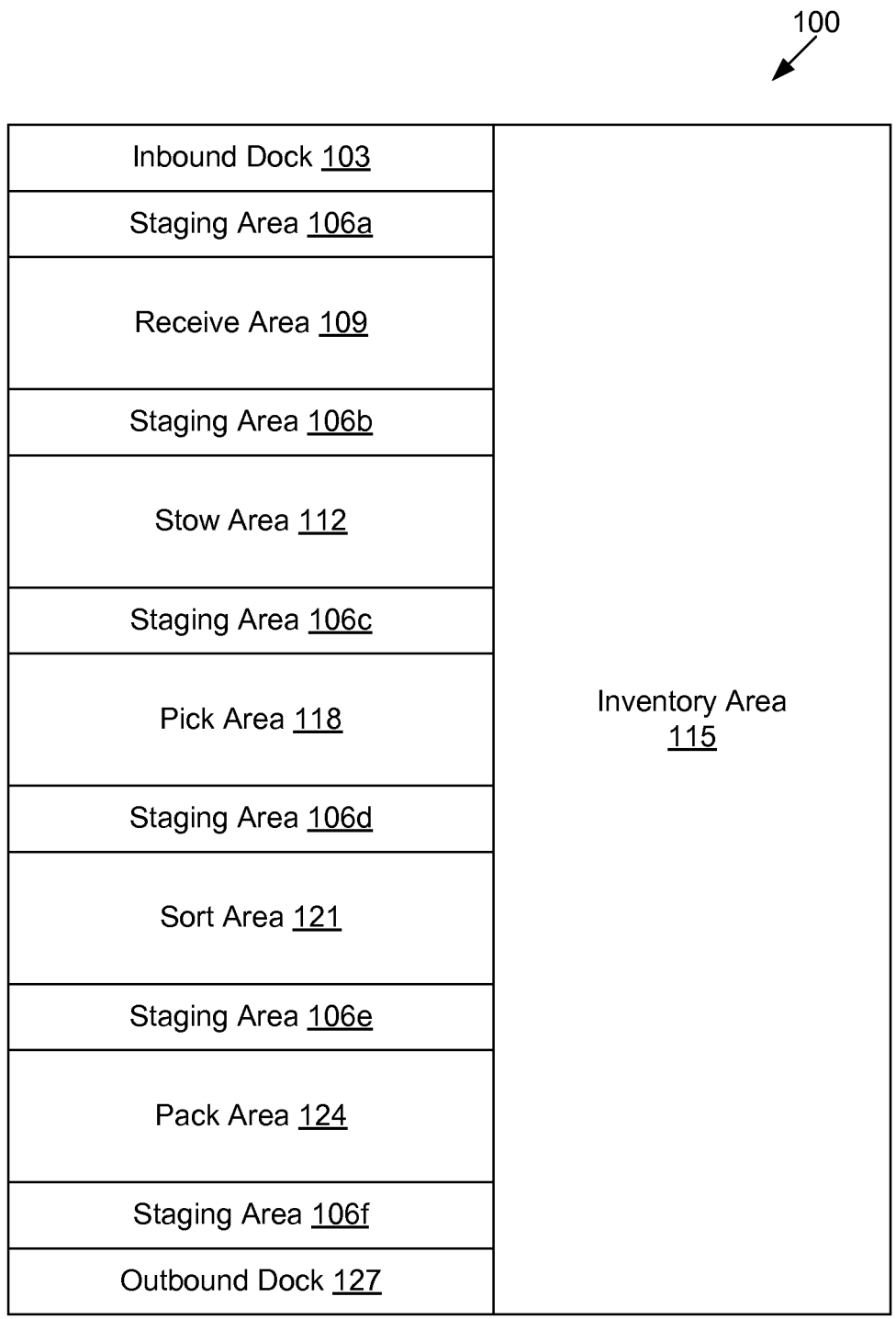
FIG. 1 is a drawing of one example of a fulfillment center according to one implementation of the present disclosure.

The present disclosure relates to determining the optimal capacities of work buffers in a pipelined process. A pipelined process may have inputs and outputs and a number of stages that make up a pipeline. Each of these stages may in turn have inputs and outputs. It may be difficult or costly to match the outputs of one stage to the inputs of the subsequent stage exactly. For example, if a first stage is producing outputs too quickly, the second stage may not be equipped to consume all of the outputs, thereby resulting in an overflow between the first and second stage. Similarly, if a first stage is producing outputs too slowly, the second stage may be starved for work, thereby resulting in an underflow. Both overflow and underflow conditions are undesirable. In an overflow condition, there is an excessive build-up of work. In contrast, in an underflow condition, resources are idled waiting for work. One solution is to place a buffer between the two stages to hold extra outputs produced by the first stage when the first stage is producing outputs too quickly so that work is available to prevent starvation in the second stage when the first stage is producing outputs too slowly.

Various implementations of the present disclosure determine an optimal capacity for such a buffer. In accordance with lean manufacturing principles, it is undesirable to have a buffer that is too small or too large. A buffer that is too small may not adequately smooth out the differing production and consumption between the two stages of the pipelined process. A certain amount of difference may be desirable, as exactly matching the production with the consumption may be expensive. Conversely, having a buffer that is too large may waste resources under lean manufacturing principles.

Suppose the inbound processing of a fulfillment center is a pipelined process with at least two stages: receive and stow. Agents at the receive stage unpack items and put them in containers to be stored, while agents at the stow stage take the containers and stow the items in various inventory storage locations. The work buffer between receive and stow in this example corresponds to the containers that are produced by the receive process and are waiting to be consumed by the stow process. The variables that correspond to the capacity of the work buffer may include a quantity of containers, space in the fulfillment center to accommodate the quantity of containers, conveyor belts to transport the containers from a receive area of the fulfillment center to a stow area of the fulfillment center, and so on. If there are not enough containers and space for the containers, an overflow condition occurs, which may interrupt the receive process. If there are too many containers or if there is too much space, valuable resources are wasted.

To determine the optimal buffer capacity, work cycles are measured. As a non-limiting example, from the measured work cycles, it may be determined that four agents working at the receive process are capable of processing 10 items per minute. It may be determined that nine agents working at the stow process are capable of processing three items per minute. Historical data may be used to predict variance between work flows. Given the work cycles, variance, number of agents at each stage, and a desired confidence, the implementations described herein generate an optimal buffer capacity for each buffer in the pipelined process.

A more detailed example of a fulfillment center will next be described, followed by an overview of the processes within the fulfillment center. Although the examples set forth herein primarily relate to fulfillment centers, it is understood that the principles of the present disclosure may be applicable to processing in other materials handling facilities, assembly lines in manufacturing facilities, demanufacturing in recycling facilities, and/or any pipelined work process that utilizes buffers.

With reference to FIG. 1, shown is one example of a fulfillment center 100 according to one implementation. The fulfillment center 100 is one example of a materials handling facility that is equipped to store inventory and fulfill orders from the inventory. The fulfillment center 100 includes a number of different areas where inventory is stored and staging and processing occur. A fulfillment center 100 performs both inbound and outbound processing of inventory. An example of the operation of the fulfillment center 100 that refers to the various areas of the fulfillment center 100 will next be described.

Beginning with inbound processing, inventory arrives at the inbound dock 103. For example, tractor trailers and/or other vehicles may arrive from manufacturers, distributors, sellers, and/or other vendors of items. These vehicles may carry items in pallets, boxes, pails, and/or other containers. In some cases, bulk goods may be received without containers. Agents offload the vehicles and store the pallets, boxes, etc., in the staging area 106a for further processing.

Next, agents in the receive area 109 retrieve pallets, boxes, etc., from the staging area 106a and begin processing the inventory contained therein. For example, the agents in the receive area 109 may record receipt of the pallets, boxes, etc., and then retrieve the items contained therein. The agents in the receive area 109 may verify the integrity of the items and confirm a received quantity. Tracking identifiers such as bar codes, radio-frequency identifiers (RFIDs), and/or other identifiers may be affixed to the items to facilitate tracking within the fulfillment center 100.

Various item preparation procedures on the received items may be performed based upon the type of item. The item preparation may be designed so as to protect the item during handling and/or storage of the item within the fulfillment center 100. For example, fragile items may be bubble wrapped, and items that could be damaged by dust may be placed within plastic bags. The item preparation for a particular item may also be designed to protect other items from the particular item. For example, an item with a potentially objectionable odor may be specially packaged so as not to transfer the odor to other items. Some items may be handled and stored without any special item preparation.

The items in the receive area 109 may then be placed in totes or other containers and/or on carts within the staging area 106b, ready to be stowed. Agents in the stow area 112 retrieve the totes and/or stow carts from the staging area 106b and proceed to store the items contained therein in the inventory area 115. The inventory area 115 may be organized into a number of storage locations, such as bins, slots, shelves, etc. An agent given a particular stow cart may be assigned a particular route within the inventory area 115 for efficiency purposes. The agent is presented with an assigned storage location for each item to be stowed, and the agent may perform one or more actions to confirm that the item has been stowed in the assigned storage location. After stowing the items, the agent may return the stow cart, totes, etc., to the stow area 112 and receive another assignment.

Outbound processing of the fulfillment center 100 begins in the pick area 118. Agents in the pick area 118 may be instructed to pick items from storage locations in the inventory area. To this end, the agents may retrieve totes and/or other containers and carts from the staging area 106c. The agents may then be presented with an efficient pick route through the inventory area to pick a list of specific items for one or more customer orders. Upon arriving at a storage location, an agent may retrieve the item from the bin, slot, shelf, etc., and then scan an identifier of the item to verify that the item has been picked. The agent then places the item in a particular tote. Upon returning to the pick area 118, the agent places the totes in the staging area 106d.

Agents in the sort area 121 obtain totes from the staging area 106d and proceed to sort the items in the totes using sortation carts. For purposes of efficiency, items may be picked from inventory separately from a grouping specified in an order. Thus, a given tote may contain items ordered by different customers, and items ordered by a given customer may be picked by different agents in different totes. The items are ultimately collated into order-based groupings in the sort area 121 using the sortation carts. In an alternative fulfillment center 100, individual orders may be separately picked, thereby obviating the need for additional sortation. The sortation carts of items are then transferred to the staging area 106e.

Agents in the pack area 124 obtain the items from the sortation carts in the staging area 106e and proceed to pack the items for shipment. To this end, an agent may retrieve a set of items from a sortation cart, retrieve appropriate packaging for the set of items, and then pack the set of items in the packaging. An agent may affix one or more identifiers or labels (e.g., a shipping label or an internal transportation tracking label) to the outside of the packaging. In some cases, additional processing may be performed on an item before it is packed. For example, an agent may gift wrap an item before it is packed. The packages may then be transported to the staging area 106f, where they may be organized for pick up by shipping carriers at the outbound dock 127.

The staging areas 106 in the foregoing discussion are understood to correspond to work buffers in the inbound and outbound pipelined processes of a fulfillment center 100. The staging areas 106 are each assigned a certain amount of area in the fulfillment center 100 along with specific other resources, e.g., containers, carts, conveyor belts, etc. Thus, the resources assigned to the work buffers may function to restrict the quantity of items held in the work buffers. As will be described herein, optimal capacities will be determined for the work buffers, which will translate into floor space, containers, and/or other resources assigned to the staging areas 106.

The foregoing discussion is not intended to be limiting. For example, alternative examples of fulfillment centers 100 may be organized into areas differing from those depicted in FIG. 1. Also, some areas in the fulfillment center 100 may overlap or share the same floor space. When tasks are described above as being performed by agents, it is understood that the tasks may be performed partially or wholly by machines, e.g., conveyor belts, robotic moving shelves, robotic pickers or stowers, machines for affixing labels, bar code and RFID scanners, and so on. The two flowcharts that follow summarize the processes performed in the example fulfillment center 100.

Figure 2A:
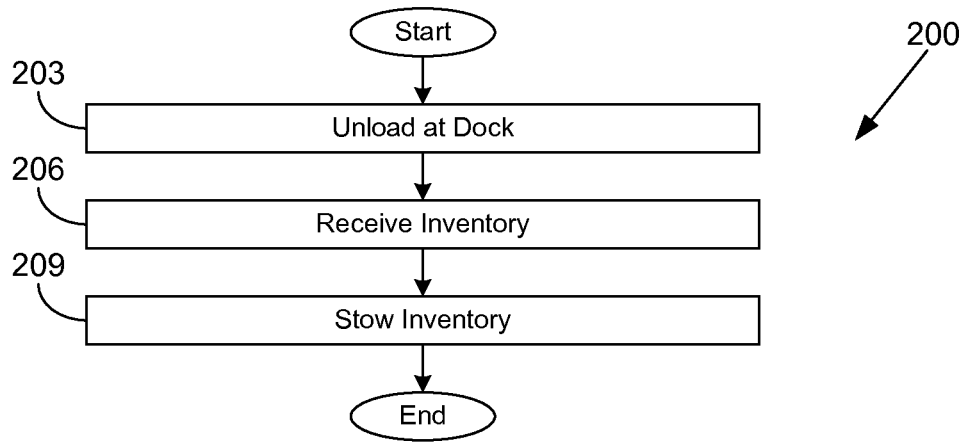
FIGS. 2A and 2B are flowcharts illustrating examples of inbound and outbound workflows in the fulfillment center of FIG. 1 according to various implementations of the present disclosure.

Referring next to FIG. 2A, shown is a flowchart 200 that provides one example of inbound processing at the example fulfillment center 100 (FIG. 1) according to various implementations. Inventory is first unloaded 203 at the inbound dock 103 (FIG. 1). Next, a receive process 206 is performed on the unloaded inventory in the receive area 109 (FIG. 1). A stow process 209 is then performed on the received inventory in the stow area 112 (FIG. 1) and the inventory area 115 (FIG. 1). The flowchart 200 subsequently ends.

Figure 2B:
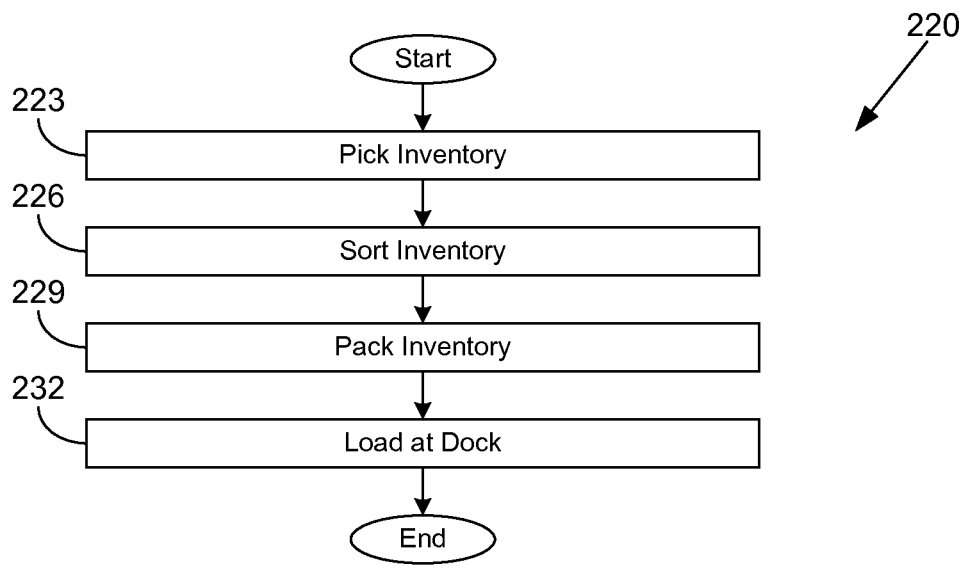

Referring next to FIG. 2B, shown is a flowchart 220 that provides one example of outbound processing at the example fulfillment center 100 (FIG. 1) according to various implementations. A pick process 223 is performed to pick ordered items from inventory at the pick area 118 (FIG. 1) and the inventory area 115 (FIG. 1). A sort process 226 is performed to sort the picked items in the sort area 121 (FIG. 1). The sorted inventory is then packed in the pack process 229 in the pack area 124 (FIG. 1). Finally, the packed inventory is loaded 232 to the outbound dock 127 (FIG. 1). The flowchart 220 subsequently ends. In the following discussion, a general description of the buffer optimization system and its components is provided, followed by a discussion of the operation of the same.

Figure 3:
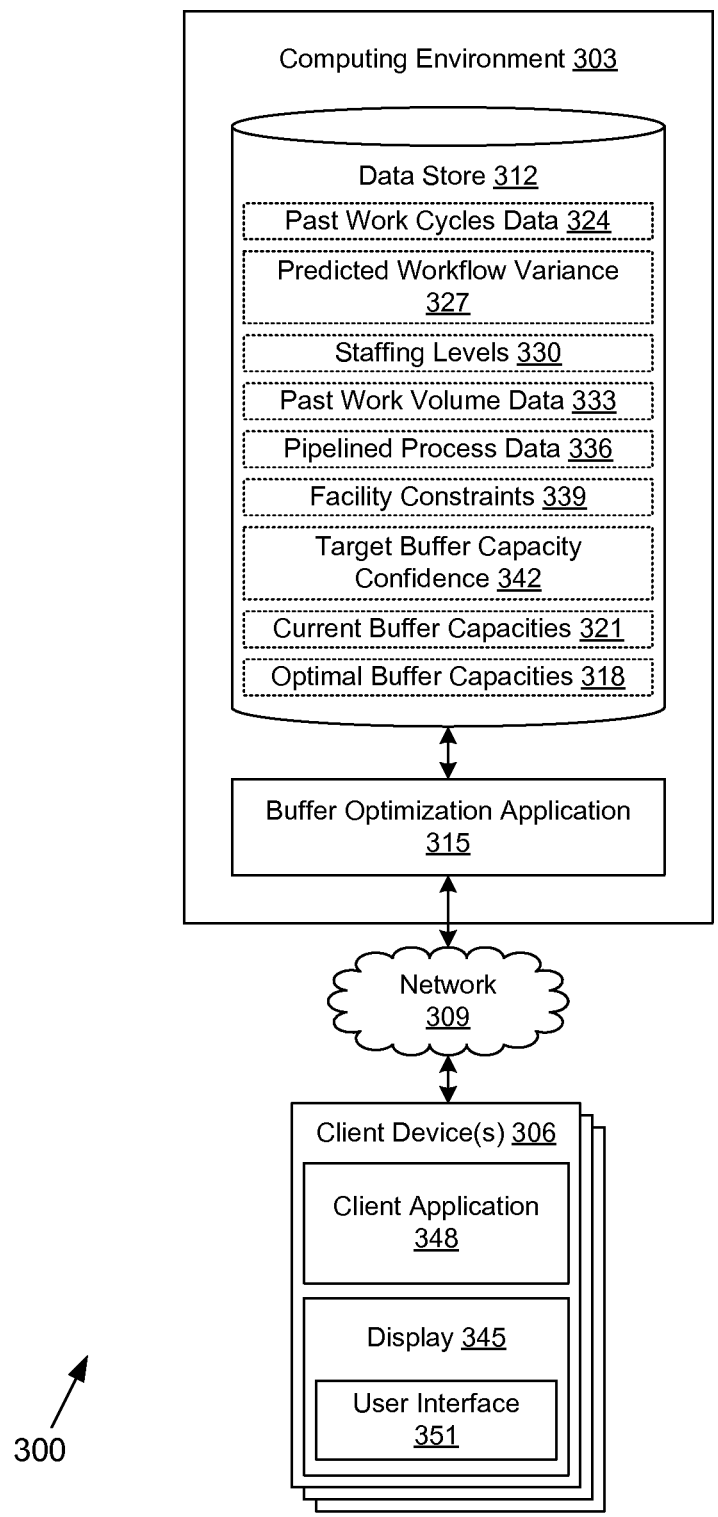
FIG. 3 is a drawing of a networked environment according to various implementations of the present disclosure.

With reference to FIG. 3, shown is a networked environment 300 according to various implementations. The networked environment 300 may include a computing environment 303 and one or more client devices 306 in data communication via a network 309. The network 309 includes, for example, the Internet, intranets, extranets, wide area networks (WANs), local area networks (LANs), wired networks, wireless networks, or other suitable networks, etc., or any combination of two or more such networks.

The computing environment 303 may comprise, for example, a server computer or any other system providing computing capability. Alternatively, the computing environment 303 may employ a plurality of computing devices that are arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource, and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various implementations. Also, various data is stored in a data store 312 that is accessible to the computing environment 303. The data store 312 may be representative of a plurality of data stores 312 as can be appreciated. The data stored in the data store 312, for example, is associated with the operation of the various applications and/or functional entities described below.

The components executed on the computing environment 303, for example, include a buffer optimization application 315 and other applications, services, processes, systems, engines, or functionality not discussed in detail herein. The buffer optimization application 315 is executed to generate optimal buffer capacities 318 for work buffers in the fulfillment center 100 (FIG. 1) and/or other materials handling facilities. Additionally, the buffer optimization application 315 may generate reports to indicate or present the optimal buffer capacities 318. The buffer optimization application 315 may also generate directives to adjust the current buffer capacities 321.

The data stored in the data store 312 includes, for example, past work cycles data 324, predicted workflow variance 327, staffing levels 330, past work volume data 333, pipelined process data 336, facility constraints 339, target buffer capacity confidence 342, current buffer capacities 321, optimal buffer capacities 318, and potentially other data. The past work cycles data 324 records a number of past work cycles for stages within a pipelined process in the fulfillment center 100 or other materials handling facility. The term "work cycle" as used herein is a metric that records a quantity of work produced by a quantity of staff members within a certain duration of time at a specific stage in the pipelined process. As a non-limiting example, the past work cycles data 324 may record that ten workers in the receive area 109 (FIG. 1) are able to process one hundred inbound items in ten minutes.

The past work cycles data 324 may incorporate numerous previously determined work cycles and may represent an average, maximum, median, minimum, or other calculation derived from the previously determined work cycles. The past work cycles may be normalized by one or more parameters. For example, the past work cycles may be normalized to unit output per staff member per minute. In some cases, however, it may be significant to maintain the data in an unnormalized state. For example, observed productivity may decline with either too many or too few staff members. Too many staff members may result in distractions or inadequate working area, while too few staff members may be overwhelmed by too great a volume. The past work cycles data 324 may be manually input via a user (e.g., a spreadsheet or web form) or may be determined directly via the buffer optimization application 315 based upon observed events and/or data records maintained for the fulfillment center 100.

The predicted workflow variance 327 may be a manually specified or automatically determined parameter that predicts a variance in a workflow, potentially for a specific period of time. For example, seasonal fluctuations in demand may result in a predicted workflow variance of 50% between a low-season volume and a high-season volume. The staffing levels 330 correspond to the current or otherwise assumed staffing levels in each of the stages of the pipelined process. For example, the staffing levels 330 may indicate fifteen employees in the receive process 206 (FIG. 2A) and thirty employees in the stow process 209 (FIG. 2A). The staffing levels 330 may refer to staff members, employees, robotic agents, and/or other agents of the fulfillment center 100.

The pipelined process data 336 corresponds to a model of the pipelined process. For example, the pipelined process data 336 may describe the various stages of the pipelined process, including the inputs and outputs of each stage as well as the resources used to facilitate the processing at each stage. To this end, the pipelined process data 336 may include various configuration parameters to control the operation of the buffer optimization application 315 for a specific pipelined process.

The facility constraints 339 may include additional configuration parameters for the pipelined process relating to the constraints imposed by the fulfillment center 100. For example, a finite amount of area may be devoted to each of the stages and/or the work buffers between two successive stages. The capacities of the work buffers may be constrained by available area in the fulfillment center 100, available containers, conveyor belt configurations, and/or other facility constraints 339. As a non-limiting example, the staging area 106d may be enlargeable up to a 1000-square-foot maximum. Further, there may be a maximum quantity of 500 stow carts available in a facility.

The target buffer capacity confidence 342 may indicate a desired or target confidence level at which the buffer optimization application 315 is to predict optimal buffer capacities 318. A relatively higher target buffer capacity confidence 342 may require a more conservative estimate from the buffer optimization application 315. Such a confidence may be desired where reconfiguration of work buffers is relatively expensive or implemented with difficulty. Conversely, a relatively lower target buffer capacity confidence 342 may enable a more liberal estimate. Such a confidence may be desired where reconfiguration of work buffers is relatively inexpensive or easily implemented.

The current buffer capacities 321 refer to the current work buffer capacities in the pipelined process. For example, the staging area 106e (FIG. 1) may be currently configured with space and carts to hold up to thirty sortation carts. The optimal buffer capacities 318 refer to estimates of optimal work buffer capacities in the pipelined process. For example, although the staging area 106e may be currently configured to hold up to thirty sortation carts, an optimal buffer capacity 318 may be computed as fifteen sortation carts, based upon the parameters provided to or determined by the buffer optimization application 315.

The client device 306 is representative of a plurality of client devices 306 that may be coupled to the network 309. The client device 306 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 306 may include a display 345. The display 345 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The client device 306 may be configured to execute various applications such as a client application 348 and/or other applications. The client application 348 may be employed to provide input data and/or other configuration parameters to the buffer optimization application 315. The client application 348 may also be executed to render reports and/or directives generated by the buffer optimization application 315. To this end, the client application 348 may be executed in a client device 306, for example, to access network content served up by the computing environment 303 and/or other servers, thereby rendering a user interface 351 on the display 345. The client application 348 may, for example, correspond to a browser, a mobile application, etc., and the user interface 351 may correspond to a network page, a mobile application screen, etc. The client device 306 may be configured to execute applications beyond the client application 348 such as, for example, browsers, mobile applications, email applications, social networking applications, and/or other applications.

Next, a general description of the operation of the various components of the networked environment 300 is provided. To begin, parameters such as past work cycles data 324, predicted workflow variance 327, staffing levels 330, past work volume data 333, and/or other parameters are either input by a user via the buffer optimization application 315 or the client application 348 or are automatically generated from observed events or logged records regarding the pipelined process. The buffer optimization application 315 then generates optimal buffer capacities 318 for the work buffers of the pipelined process. The buffer optimization application 315, in one scenario, may assume that the staffing levels 330 are fixed quantities as reassigning staff members may be expensive.

The optimal buffer capacities 318 may be generated on a periodic schedule or according to various thresholds that control whether a change to buffer capacity would be cost effective. After the optimal buffer capacities 318 are generated, they are reported to a user at the client device 306 and/or directives to implement enlarging or reducing work buffers are generated. It is noted that the optimal buffer capacities 318 may change over time and may vary based upon the characteristics of the fulfillment center 100 (e.g., workforce productivity, types of inventory processed, seasons, etc.). Thus, updated optimal buffer capacities 318 may be generated based upon updated staffing levels 330, work volumes, facility constraints 339, and/or other parameters.

Figure 4:
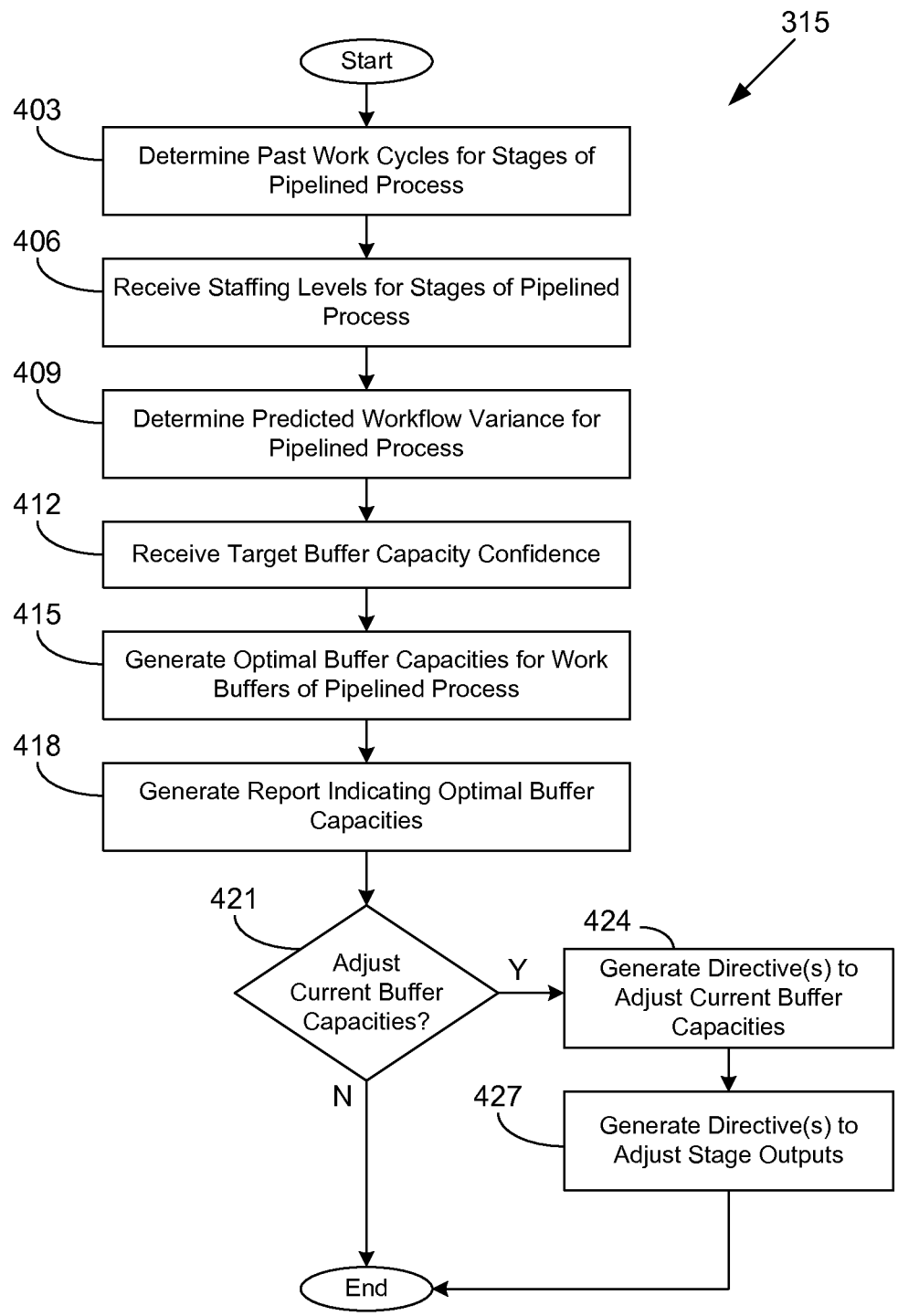
FIG. 4 is a flowchart illustrating one example of functionality implemented as portions of a buffer optimization application executed in a computing environment in the networked environment of FIG. 3 according to various implementations of the present disclosure.

Referring next to FIG. 4, shown is a flowchart that provides one example of the operation of a portion of the buffer optimization application 315 according to various implementations. It is understood that the flowchart of FIG. 4 provides merely an example of the many different types of functional arrangements that may be employed to implement the operation of the portion of the buffer optimization application 315 as described herein. As an alternative, the flowchart of FIG. 4 may be viewed as depicting an example of steps of a method implemented in the computing environment 303 (FIG. 3) according to one or more implementations.

Beginning with box 403, the buffer optimization application 315 determines past work cycles for the stages of a pipelined process. For example, the buffer optimization application 315 may load past work cycles data 324 (FIG. 3), which may correspond to data provided manually by a user or determined automatically as a consequence of the operation of the pipelined process. In box 406, the buffer optimization application 315 receives staffing levels 330 (FIG. 3) for the stages of the pipelined process. Such staffing levels 330 may be manually input or may be automatically determined, e.g., via communication with a human resources system by way of the network 309 (FIG. 3).

In box 409, the buffer optimization application 315 determines a predicted workflow variance 327 (FIG. 3) for the pipelined process. The predicted workflow variance 327 may be manually input by a user at a client device 306 (FIG. 3) or may be automatically determined based at least in part on the past work volume data 333 (FIG. 3), predicted future work volumes, predicted mixtures of work that can be processed at different rates, and/or other data. In some cases, the predicted workflow variance 327 may be determined for a specified time period of validity. In box 412, the buffer optimization application 315 receives a target buffer capacity confidence 342 (FIG. 3), e.g., from a user at a client device 306 or from the data store 312 (FIG. 3).

In box 415, the buffer optimization application 315 generates optimal buffer capacities 318 (FIG. 3) for the work buffers of the pipelined process. The optimal buffer capacities 318 may include, for example, a container specification for transferring materials between stages, a size of an area within the fulfillment center 100 (FIG. 1) in which a portion of the pipelined process is performed, and/or other resources relating to the notion of buffer capacity. The optimal buffer capacities 318 may be generated based at least in part on factors such as the past work cycles, the current and/or projected staffing levels 330, the predicted workflow variance 327, the target buffer capacity confidence 342, facility constraints 339, costs, and/or other configuration parameters.

The optimal buffer capacities 318 may be predicted to be optimal in that they are selected so as not to be too large, which would result in a waste of resources, and not to be too small, which would result in potential overflow and pipeline stalls. Given the past work cycles, the staffing levels 330, the predicted workflow variance 327, and other constraints, the input and output of each stage may be matched with appropriate buffer sizes to keep the stages of the pipelined process running with maximum throughput.

As a non-limiting example, suppose that the receive process 206 (FIG. 2A) is operating with 10 staff members and that the stow process 209 (FIG. 2A) is operating with 20 staff members. According to the past work cycles data 324, during the time period presented for analysis, the receive process 206 is predicted to process up to 100 items in 10 minutes, while the stow process 209 is predicted to process up to 50 items in 10 minutes. Thus, a larger buffer for the output of the receive process 206 may be desired as compared to the output of the stow process 209.

The predicted workflow variance 327, which may be determined on a per-stage or a per-pipelined-process basis, may indicate a workflow range for the receive process 206 of between 10 items and 100 items and a workflow range for the stow process 209 of between 40 and 50 items. Based upon this factor, the buffer before the receive process 206 may need to be relatively larger than the buffer before the stow process 209 in order to accommodate the greater variance. The target buffer capacity confidence 342 may be used to control the variance, e.g., to exclude rare situations that would otherwise cause excessively large buffers to be recommended. Further, the target buffer capacity confidence 342 may be used to avoid recommending buffer changes that are costly or otherwise undesirable.

In box 418, the buffer optimization application 315 generates a report indicating optimal buffer capacities 318. The report may be sent to the client device 306 for rendering via the network 309 (FIG. 3). For example, the report may indicate current buffer capacities 321 (FIG. 3) for each pipeline stage, optimal buffer capacities 318 for each pipeline stage, and/or metrics regarding cost savings and/or pipeline performance enhancements corresponding to adopting the optimal buffer capacities 318. In box 421, the buffer optimization application 315 determines whether the current buffer capacities 321 are to be adjusted. For example, one or more work buffers may be modified (i.e., reduced or enlarged) to implement the optimal buffer capacities 318. In some cases, configuration parameters may dictate that the work buffers not be adjusted except based upon various thresholds for adjustment frequency, thresholds for minimum change, and so on.

If any current buffer capacities 321 are to be adjusted, the buffer optimization application 315 proceeds to box 424 and generates one or more directives to adjust current buffer capacities 321. Such directives may be staff member directives that are sent to and rendered by the client device 306. Such directives may also take the form of instructions to automatic devices in the fulfillment center 100 (FIG. 1) that may automatically implement buffer capacity change. For example, a device may automatically move additional sortation carts to the staging area 106*e* (FIG. 1) in response to a directive to enlarge the corresponding work buffer between the sort process 226 (FIG. 2B) and the pack process 229 (FIG. 2B).

In box 427, the buffer optimization application 315 may generate one or more directives to adjust outputs of stages in the pipeline. For example, if an adjusted buffer capacity is larger than before, the buffer optimization application 315 may generate a directive to systems or personnel of the upstream stages to adjust output to maximize usage of the larger buffer capacity. Thereafter, or if the current buffer capacities 321 are not to be adjusted, the portion of the buffer optimization application 315 ends.

Figure 5:
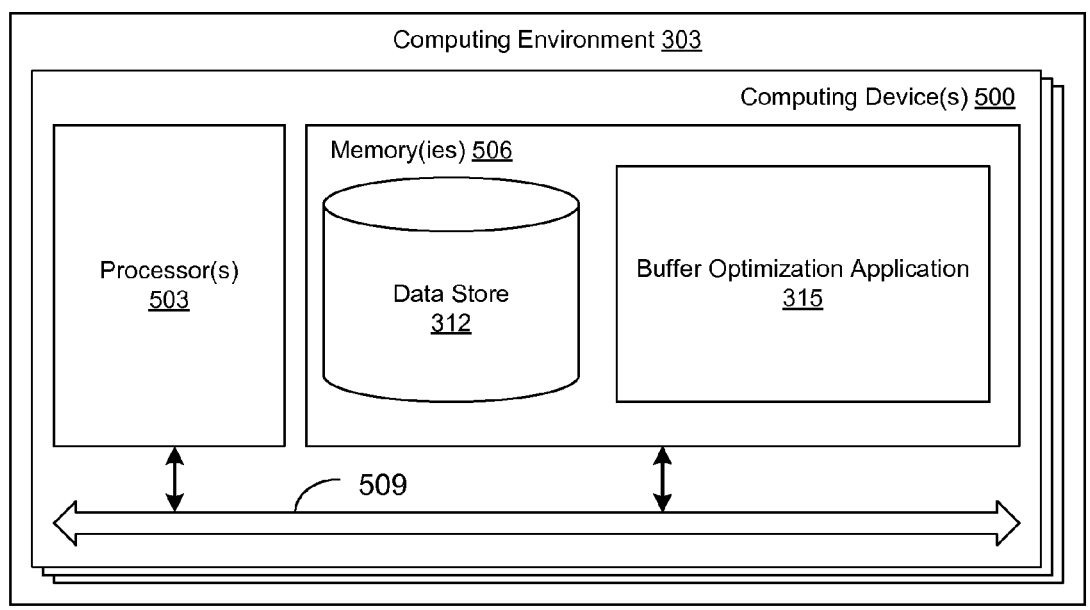
FIG. 5 is a schematic block diagram that provides one example illustration of a computing environment employed in the networked environment of FIG. 3 according to various implementations of the present disclosure.

With reference to FIG. 5, shown is a schematic block diagram of the computing environment 303 according to an implementation of the present disclosure. The computing environment 303 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the buffer optimization application 315 and potentially other applications. Also stored in the memory 506 may be a data store 312 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the buffer optimization application 315 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the buffer optimization application 315. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some implementations, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the buffer optimization application 315, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described implementations of the present disclosure are merely possible examples of implementations set forth for a clear understanding of the principles of the disclosure. Many variations and modifications may be made to the above-described implementation(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
   code that determines respective past work cycles for individual ones of a plurality of stages in a pipelined materials handling process in a fulfillment center, the pipelined materials handling process including respective work buffers between successive ones of the plurality of stages;
   code that determines respective staffing levels for the individual ones of the plurality of stages;
   code that predicts a workflow variance for the pipelined materials handling process;
   code that generates respective optimal buffer capacities for individual ones of the respective work buffers based at least in part on a target buffer capacity confidence, the predicted workflow variance, the respective staffing levels, and the respective past work cycles; and
   code that generates a report indicating the respective optimal buffer capacities.

2. The non-transitory computer-readable medium of claim 1, wherein at least one of the respective optimal buffer capacities comprises a size of an area within the fulfillment center in which at least a portion of the pipelined materials handling process is performed.

3. The non-transitory computer-readable medium of claim 1, wherein at least one of the respective optimal buffer capacities comprises a container specification for transferring materials between a first one of the plurality of stages and a second one of the plurality of stages.

4. The non-transitory computer-readable medium of claim 1, further comprising code that generates a directive to modify a respective current output of at least one of the plurality of stages responsive to implementing at least one of the respective optimal buffer capacities.

5. The non-transitory computer-readable medium of claim 1, further comprising code that generates a directive to modify a respective current capacity of at least one of the respective work buffers to implement at least one of the respective optimal buffer capacities.

6. A system, comprising:
   at least one computing device; and
   a buffer optimization application executed in the at least one computing device, the buffer optimization application comprising:
   logic that receives data indicating respective past work cycles for individual ones of a plurality of stages in a pipelined process, the pipelined process including respective work buffers between successive ones of the plurality of stages;
   logic that receives respective staffing levels for individual ones of the plurality of stages and a predicted workflow variance; and
   logic that generates respective optimal buffer capacities for individual ones of the respective work buffers based at least in part on the predicted workflow variance, the respective staffing levels, and the respective past work cycles.

7. The system of claim 6, wherein the buffer optimization application further comprises:
   logic that receives a target buffer capacity confidence; and
   wherein the respective optimal buffer capacities are generated further based at least in part on the target buffer capacity confidence.

8. The system of claim 6, wherein the buffer optimization application further comprises logic that generates a report indicating the respective optimal buffer capacities.

9. The system of claim 6, wherein the buffer optimization application further comprises:
   logic that determines whether a particular optimal buffer capacity for a particular work buffer is below a current buffer capacity of the particular work buffer; and
   logic that generates a directive to reduce the current buffer capacity of the particular work buffer when the particular optimal buffer capacity is below the current buffer capacity.

10. The system of claim 6, wherein the buffer optimization application further comprises:
   logic that determines whether a particular optimal buffer capacity for a particular work buffer is above a current buffer capacity of the particular work buffer; and
   logic that generates a directive to enlarge the current buffer capacity of the particular work buffer when the particular optimal buffer capacity is above the current buffer capacity.

11. The system of claim 6, wherein at least one of the respective optimal buffer capacities comprises a size of an area within a building in which at least a portion of the pipelined process is performed.

12. The system of claim 6, wherein the predicted workflow variance is received from a user.

13. The system of claim 6, wherein the buffer optimization application further comprises logic that determines the predicted workflow variance based at least in part on data indicating a plurality of past workflows for the pipelined process.

14. The system of claim 13, wherein the predicted workflow variance is determined further based at least in part on a time period of validity for the respective optimal buffer capacities.

15. A method, comprising:
   receiving, by at least one computing device, data indicating respective past work cycles for a first stage and a second stage of a pipelined process, the pipelined process including a work buffer between the first stage and the second stage;
   receiving, by the at least one computing device, respective staffing levels for the first stage and the second stage; and
   generating, by the at least one computing device, an optimal buffer capacity for the work buffer based at least in part on a predicted workflow variance for the pipelined process, the respective staffing levels, and the respective past work cycles.

16. The method of claim 15, further comprising generating, by the at least one computing device, the predicted workflow variance based at least in part on past workflow volume data for the pipelined process.

17. The method of claim 15, wherein the pipelined process comprises a processing workflow of a fulfillment center.

18. The method of claim 17, wherein the processing workflow comprises an inbound processing workflow or an outbound processing workflow.

19. The method of claim 15, wherein the work buffer is configured to receive an output of the first stage and provide an input to the second stage.

20. The method of claim 15, further comprising generating, by the at least one computing device, an updated optimal buffer capacity for the work buffer based at least in part on updated respective staffing levels for the first stage and the second stage.

* * * * *